(12) United States Patent
Van Houzen et al.

(10) Patent No.: US 6,932,415 B1
(45) Date of Patent: Aug. 23, 2005

(54) DOOR SEALING ASSEMBLY

(75) Inventors: Darren M. Van Houzen, Royal Oak, MI (US); John James Senopole, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/797,862

(22) Filed: Mar. 10, 2004

(51) Int. Cl.⁷ .................................................. B60J 1/08
(52) U.S. Cl. ............................... 296/146.2; 296/146.9; 49/498.1
(58) Field of Search ........................... 296/146.2, 146.9, 296/146.3, 146.8, 201, 93, 106, 154, 213; 49/498.1, 484.1, 441, 490.1, 502, 479.1, 49/374, 495.1, 377, 475.1, 440, 489.1, 375

(56) References Cited

U.S. PATENT DOCUMENTS

| | | | |
|---|---|---|---|
| 3,603,035 A * | 9/1971 | Kaldenberg | 49/489.1 |
| 5,347,758 A * | 9/1994 | Yamane | 49/484.1 |
| 5,352,009 A * | 10/1994 | Takeuchi | 296/146.9 |
| 5,489,104 A * | 2/1996 | Wolff | 49/498.1 |
| 5,555,677 A * | 9/1996 | DeRees et al. | 296/146.2 |
| 5,649,405 A * | 7/1997 | Morihara et al. | 296/146.2 |
| 6,007,140 A * | 12/1999 | Heitmann et al. | 296/146.9 |
| 6,039,384 A * | 3/2000 | Schulte et al. | 296/146.2 |
| 2001/0054261 A1 * | 12/2001 | Nozaki et al. | 49/498.1 |
| 2004/0088925 A1 * | 5/2004 | Nozaki | 49/498.1 |

* cited by examiner

Primary Examiner—Kiran B. Patel
(74) Attorney, Agent, or Firm—Laura C. Hargitt

(57) ABSTRACT

The present invention is a door sealing assembly for sealing a vehicle door to a body. The door includes a frameless door glass and a mirror patch adjacent a front edge of the door glass. The assembly includes a first seal member that is adapted to be attached to the vehicle body and sealingly engages the mirror patch, and a second seal member that is adapted to be attached to the vehicle body and sealingly engages the door glass. A third seal member is adapted to be attached to the mirror patch and sealingly engages the door glass and the second seal member.

12 Claims, 3 Drawing Sheets

DOOR SEALING ASSEMBLY

BACKGROUND OF THE INVENTION

The present invention relates in general to automobile body seals and moldings and, in particular, to an assembly for sealing a vehicle door to a body.

Seals and seal assemblies are used extensively in the automotive industry to, for example, prevent water and foreign objects from entering the vehicle interior and decrease the level of wind noise experienced by the vehicle's passengers. Frameless glass and door assemblies are becoming more common in production vehicles because of customers' preference of their aesthetically pleasing look as well as the requirements for convertible vehicles and the like. A common problem with frameless glass and door assemblies, however, is that sealing the surfaces of the door glass, the vehicle door and mirror patch (a sheet metal extension from the vehicle door to which the side view mirror assembly is attached), and the vehicle body at the A pillar (the roof pillar adjacent the vehicle door) is difficult to accomplish.

Some prior art seals have a thin rubber seal bridging the door side primary seal path for sealing on the door glass to the door inner panel at the top of the mirror flag. Other prior art seals include an adjustable mirror patch that can be adjusted to compensate for the position of the side door glass. Still other prior art seals have the outside rear view mirror mounted to the side door outer panel. Each of these prior art seals, however, have experienced problems including, but not limited to, poor seal performance, visible joint locations, complexity of assembly and adjustment, and limitations on styling flexiblity.

It is desirable, therefore, to provide an improved sealing assembly for sealing a vehicle door to a body, especially for frameless glass and door assemblies.

SUMMARY OF THE INVENTION

The present invention concerns an assembly for sealing a vehicle door to a body. The door includes a frameless door glass and a mirror patch adjacent a front edge of the door glass. The assembly includes a first seal member that is adapted to be attached to the vehicle body and sealingly engages the mirror patch, and a second seal member that is adapted to be attached to the vehicle body and sealingly engages the door glass. A third seal member is adapted to be attached to the mirror patch and sealingly engages the door glass and the second seal member.

The sealing assembly in accordance with the present invention creates a design with improved sealing performance while also providing the appearance of a traditional construction. The sealing assembly is more robust than prior art sealing assemblies and reduces wind noise and water leakage. The sealing assembly in accordance with the present invention increases the quality of the side door glass and side door sealing system by making the integrity of the sealing interface less sensitive to dimensional variation in the parts and vehicle assembly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
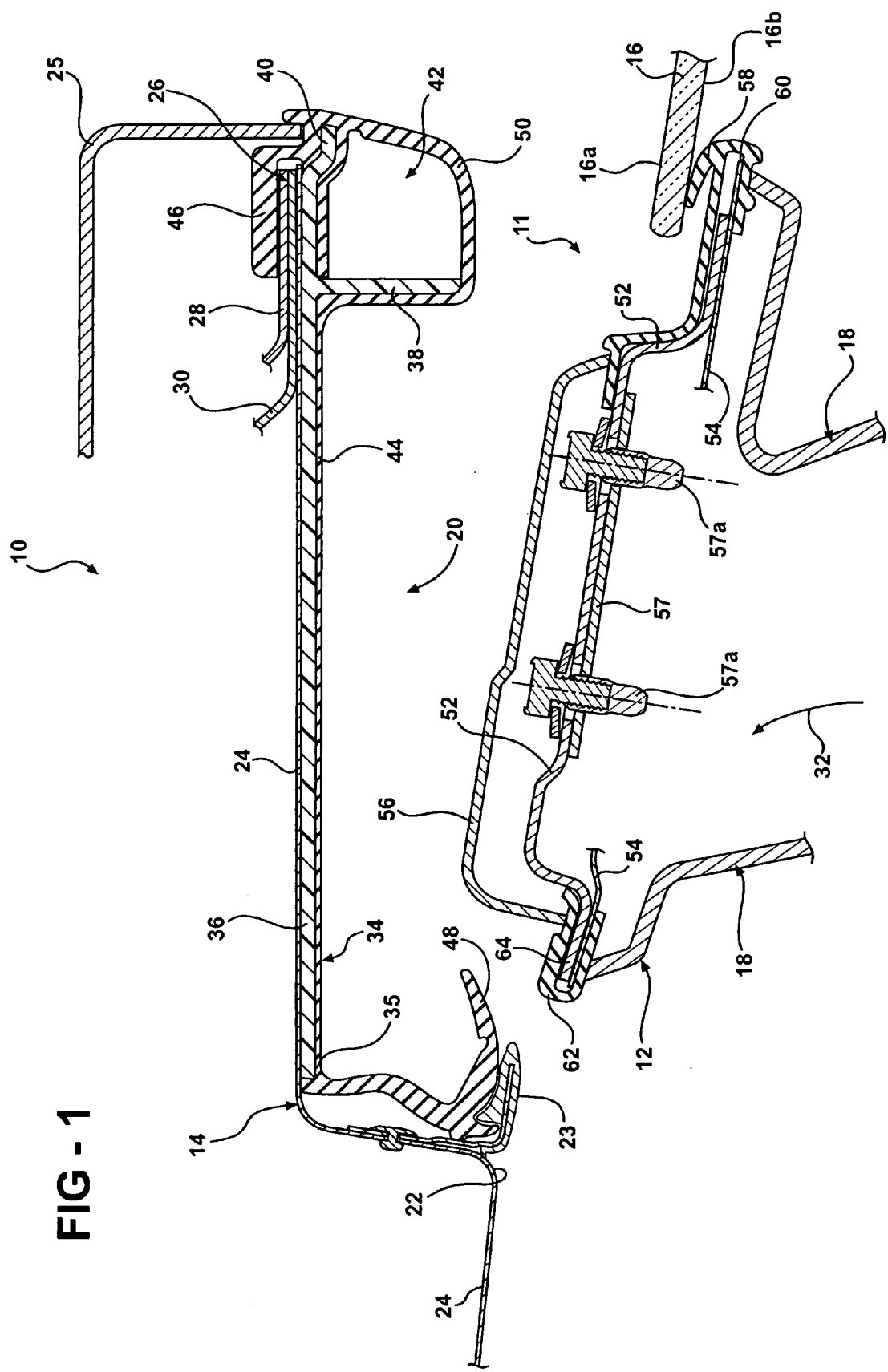
FIG. 1 is a fragmentary cross sectional view of a sealing assembly in accordance with the present invention shown in a door open position.

Referring now to FIGS. 1–4, a sealing assembly in accordance with the present invention is indicated generally at 10. The sealing assembly 10 is operable to seal mating surfaces of a vehicle door 12 and a body 14, such as a vehicle body. Preferably, the body 14 is a portion of the A-pillar of a vehicle body. The vehicle door 12 includes a door glass 16, which includes an inner surface 16a and an outer surface 16b, attached thereto. Preferably, the door glass 16 is a frameless door glass, best seen in FIG. 3. A frameless door glass, such as the door glass 16, does not include a window frame extending upwardly from the vehicle door wherein the door glass travels in a path defined by the window frame or a header. A mirror patch portion 18 extends outwardly from the vehicle door 12 adjacent a front edge of the door glass 16. Preferably, the door glass 16 is movable along a vertical path (not shown) within the vehicle door 12 by a window regulator (not shown) or the like. A side view mirror (not shown) or the like is preferably mounted on a free end (not shown) of the mirror patch 18.

The vehicle body 14 defines a gap 20 between a shoulder 22 of a first body panel 24 and a flange 26 formed by joined ends of the first body panel 24, a second body panel 28, and a third body panel 30. The vehicle door 12 is hingedly attached (not shown) to the vehicle body 14 proximate to the shoulder 22 and moves between an open position, shown in FIG. 1, and a closed position, shown in FIG. 2, along a swing axis indicated by an arrow 32. The gap 20 receives the mirror patch portion 18 of the vehicle door 12 when the door is in the closed position, discussed in more detail below. A molding assembly 23 is attached to the vehicle body 14 adjacent the shoulder 22 and a trim assembly 25 is attached to the vehicle body 14 (not shown) and covers the flange 26.

A primary seal assembly, indicated generally at 34, is disposed in the gap 20 of the vehicle body 14. The seal assembly 34 includes a frame member 36 having a first flange 38 and a second flange 40 extending outwardly therefrom. Preferably, the frame member 36 is formed of a steel material, a stiff plastic material, or the like. The flanges 38 and 40 extend in substantially perpendicular directions from the frame member 36 and define a space 42 therebetween.

The seal assembly 34 also includes a seal portion 44 disposed on and enclosing the frame member 36. Preferably, the seal portion 44 is constructed of an elastomeric material such as rubber weatherstripping material, a polymer material or the like. Preferably, when the seal assembly 34 is constructed, the seal portion 44 is molded or co-molded with the frame member 36. Alternatively, the seal portion 44 is attached to the frame member 36 by an adhesive, a retention feature (not shown) disposed on the seal portion 44, or the like. An end 46 of the seal portion 44 encloses the flange 26 and secures the seal assembly 34 thereto. The seal assembly 34 is also attached to the vehicle body 14 in the gap 20 by a plurality of fasteners (not shown), such as rivets, push pins, or the like. Alternatively, the seal assembly 34 is attached to the vehicle body 14 by an adhesive or the like. When attached to the vehicle body 14, the flanges 38 and 40 are disposed adjacent the flange 26 and an end 35 of the seal assembly 34 opposite the flanges 38 and 40 is disposed adjacent the shoulder 22.

The seal portion 44 of the seal assembly 34 defines a first seal member 48 adjacent the shoulder 22 and extending outwardly therefrom. The seal portion 44 of the seal assembly 34 defines a second seal member 50 adjacent the flange 26. The second seal member 50 extends between respective free ends of the flanges 38 and 40 and encloses the space 42 between the flanges 38 and 40. The seal assembly 34 is preferably formed as an integral, monolithic assembly.

The vehicle door 12 includes the mirror patch portion 18 and the side view mirror extending therefrom. The mirror patch portion 18 is attached to an inner door panel 52 and an outer door panel 54 which, when attached, form the vehicle door 12. A trim component 56 encloses the inner door panel 52 and the outer door panel 54. A reinforcement member 57 is attached to the inner door panel 52 by a plurality of fasteners 57a.

A third seal member 58 is attached to a flange 60 formed by joined ends of the inner door panel 52 and the outer door panel 54 of the vehicle door 12 adjacent the door glass 16. When the door glass 16 is in an upper, closed position, the third seal member 58 sealingly engages with the outer surface 16b of the door glass 16 to prevent air and/or debris from entering the interior (not shown) of the vehicle body 14. The third seal member 58 is preferably constructed of an elastomeric material such as rubber weatherstripping, polymer material or the like. A casing 62 is attached to a flange 64 formed by joined ends of the inner door panel 52 and the outer door panel 54 of the vehicle door 12 on an end of the vehicle door 12 opposite the flange 60. The casing 62 is preferably constructed of an elastomeric material such as rubber weatherstripping material, a polymer material or the like. The vehicle door 12, the door glass 16, and the third seal member 58, when attached, form a door assembly, indicated generally at 11. The vehicle door 12 of the door assembly 11 includes an upper edge 12a, best seen in FIG. 3.

Figure 2:
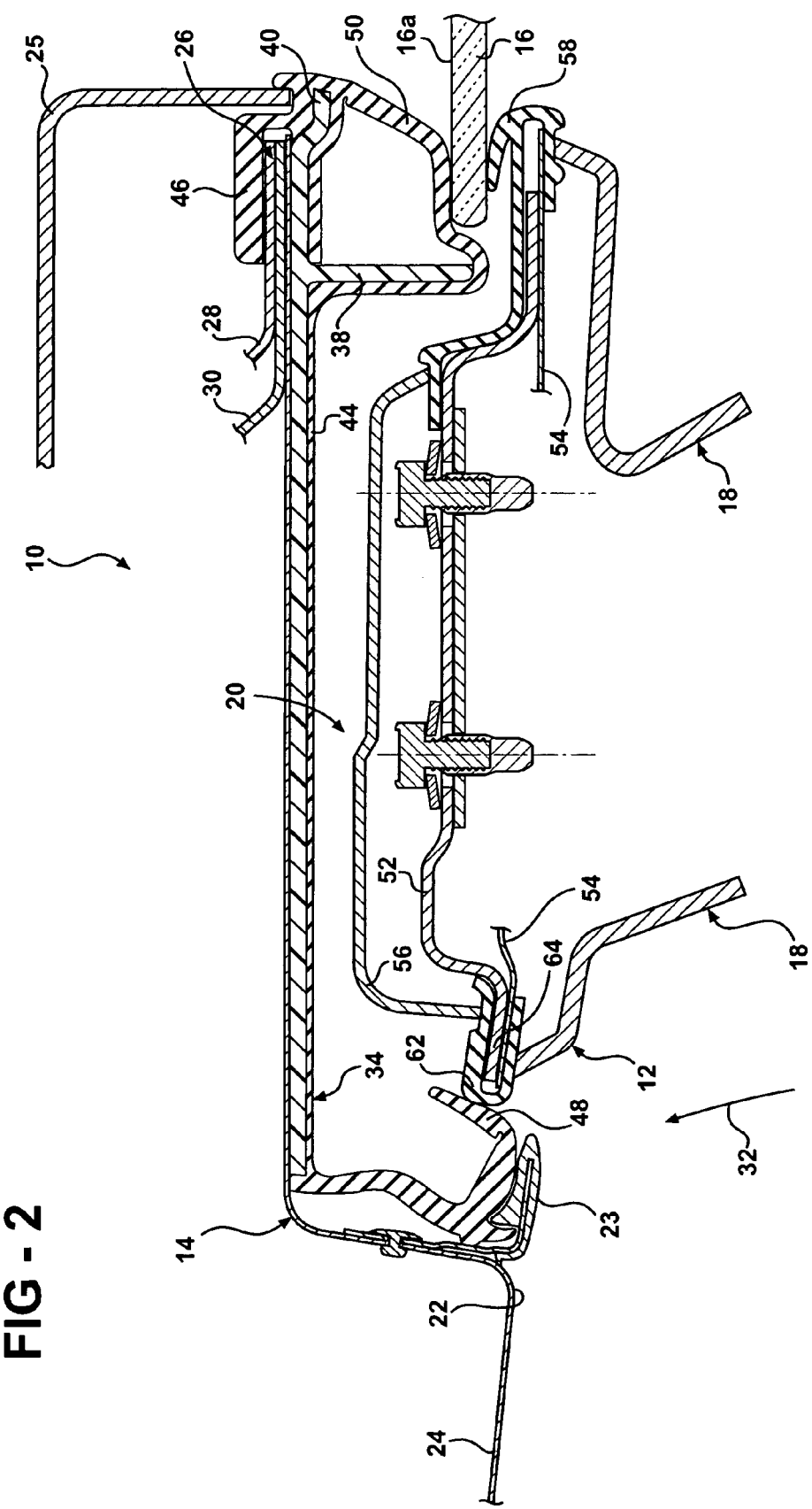
FIG. 2 is fragmentary cross sectional view of the sealing assembly of FIG. 1 shown in a door closed position.
Figure 3:
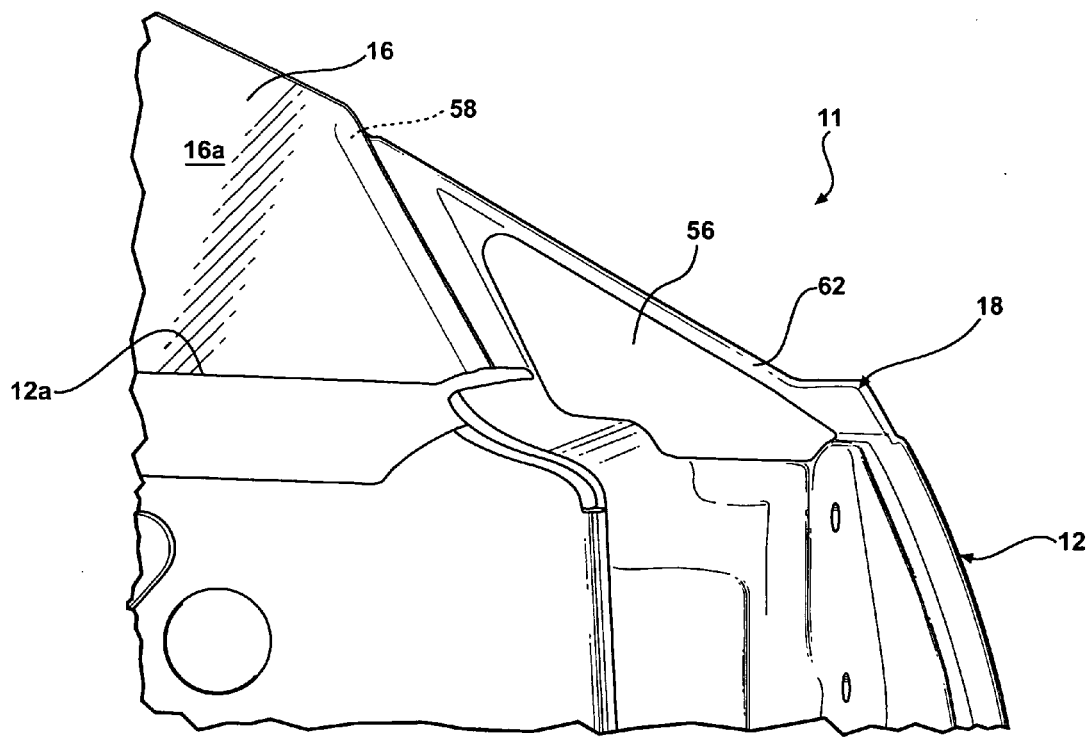
FIG. 3 is a fragmentary side plan view of a door assembly in accordance with the present invention.
Figure 4:
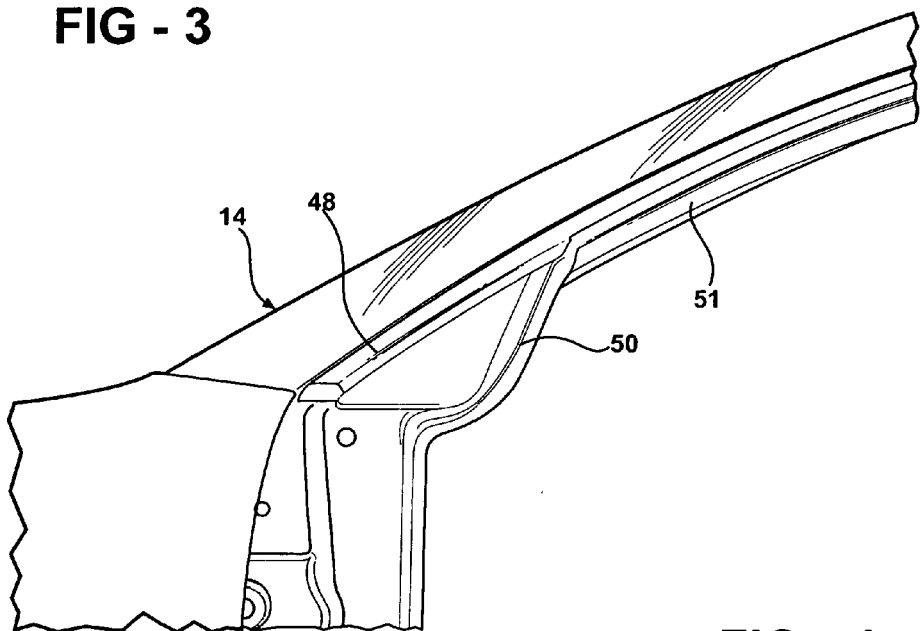
FIG. 4 is a fragmentary side plane view of a vehicle body in accordance with the present invention.

In operation, the vehicle door 12 moves from the door open position of FIG. 1, to the door closed position of FIG. 2. In the door closed position, the first seal member 48 sealingly engages with the shroud 62 of the mirror patch portion 18 of the vehicle door 12 and the second seal member 50 sealingly engages with the surface 16a of the door glass 16 (when the door glass 16 is in the upper, closed position) to prevent air and/or debris from entering the interior (not shown) of the vehicle body 14. With the door glass 16 in the upper, closed position, the third seal member 58 continues to sealingly engage with the outer surface 16b of the door glass to prevent air and/or debris from entering the interior of the vehicle body 14. The second seal member 50 and the third seal member 58 advantageously seal the opposing surfaces 16a and 16b of the door glass 16, reducing wind noise and preventing water leakage. The second seal member 50 may be molded to an extruded seal member 51, best seen in FIG. 4 and having a seamless transition, that seals along the upper edge of the inner surface 16a of the door glass 16.

The seal assembly 10 in accordance with the present invention advantageously allows the door glass 16 to seal continuously to the vehicle body 14 through the mirror patch portion 18 of the vehicle door 12 with the second seal member 50 and the third seal member 58 preventing air and/or debris from entering the interior of the vehicle body 14. The seal members 48, 50, and 58 also advantageously reduce wind noise and water from entering the passenger compartment by providing three sealing members (48, 50, and 58) between opposed surfaces the vehicle body 14, the vehicle door 12, and the door glass 16. The seal assembly 10 also makes the integrity of the respective sealing interfaces less sensitive to dimensional variation in the vehicle door 12, the vehicle body 14, and the door glass 16 because the sealing members 48, 50, and 58 can accommodate minor variations in the assembly of the vehicle door 12, the vehicle body 14, and the door glass 16. This is important because unlike a door glass moving in a window frame wherein the door glass travels in a path defined by the window frame or a header, a frameless door glass window, such as the door glass 16, experiences high loads when engaged in the seals on the vehicle body. These seal loads may vary with atmospheric conditions or due to dimension variations in parts causing the door glass to vary from the nominal position when the window is up and in the door is in the closed position. The sealing assembly 10 according to the present invention allows the door glass 16 to vary in position without the need to adjust the seal members 48, 50, and 58, and without requiring an adjustable mirror patch, while providing satisfactory sealing.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An assembly for sealing a vehicle door to a body, comprising:
   a vehicle body defining at least one gap therein;
   a seal assembly mounted on said vehicle body and extending across said gap;
   a door having an upper edge;
   a frameless door glass extending upwardly from said upper edge;
   a mirror patch extending upwardly from said upper edge; and
   a seal member mounted on a surface of said mirror patch and sealingly engaging an outer surface of said door glass.

2. The assembly according to claim 1 wherein said seal assembly includes a frame and a seal portion enclosing said frame.

3. The assembly according to claim 2 wherein said seal portion includes a first seal member attached to the vehicle body and sealingly engage the mirror patch.

4. The assembly according to claim 3 including a casing attached to the mirror patch.

5. The assembly according to claim 4 wherein said casing member is formed of a rubber weatherstripping material.

6. The assembly according to claim 4 wherein said casing member is formed of a polymer material.

7. The assembly according to claim 2 wherein said seal portion includes a second seal member attached to the vehicle body and sealingly engage an inner surface of said door glass.

8. The assembly according to claim 2 wherein said frame includes a pair of flanges extending substantially perpendicular from said frame and defining a space therebetween.

9. The assembly according to claim 8 wherein one of a first seal member and a second seal member extends across the space between said pair of flanges.

10. The assembly according to claim 1 wherein said vehicle body defines the gap between a flange formed by joined body panels and a shoulder in said body panels.

11. The assembly according to claim 1 wherein said seal portion is formed of a rubber weatherstripping material.

12. The assembly according to claim 1 wherein said seal portion is formed of a polymer material.

* * * * *